United States Patent
Schulze et al.

(10) Patent No.: US 11,285,689 B2
(45) Date of Patent: Mar. 29, 2022

(54) MULTI-LAYER ACOUSTIC AND/OR REINFORCING NONWOVEN FABRIC

(71) Applicant: Adler Pelzer Holding GmbH, Hagen (DE)

(72) Inventors: Volkmar Schulze, Schierling (DE); Norbert Nicolai, Schermbeck-Gahlen (DE); Herbert Vollmert, Kamp-Lintfort (DE); Ctirad Zikmund, Brasy (CZ); Marco Schneider, Essen (DE); Reimund Piatkowski, Dortmund (DE)

(73) Assignee: Adler Pelzer Holding GMBH, Hagen (DE)

( * ) Notice: Subject to any disclaimer, the term of this patent is extended or adjusted under 35 U.S.C. 154(b) by 289 days.

(21) Appl. No.: 16/080,122

(22) PCT Filed: Feb. 17, 2017

(86) PCT No.: PCT/EP2017/053617
§ 371 (c)(1),
(2) Date: Aug. 27, 2018

(87) PCT Pub. No.: WO2017/148711
PCT Pub. Date: Sep. 8, 2017

(65) Prior Publication Data
US 2019/0061311 A1 Feb. 28, 2019

(30) Foreign Application Priority Data
Mar. 1, 2016 (DE) .......................... 102016203348.4

(51) Int. Cl.
*B32B 5/02* (2006.01)
*B32B 5/06* (2006.01)
(Continued)

(52) U.S. Cl.
CPC .............. *B32B 5/022* (2013.01); *B32B 3/266* (2013.01); *B32B 5/06* (2013.01); *B32B 5/08* (2013.01); *B32B 5/26* (2013.01); *B32B 27/08* (2013.01); *B32B 27/12* (2013.01); *B32B 27/14* (2013.01); *B32B 27/32* (2013.01); *B32B 27/34* (2013.01); *B32B 27/36* (2013.01); *G10K 11/168* (2013.01);
(Continued)

(58) Field of Classification Search
CPC ........................................................ B32B 5/02
See application file for complete search history.

(56) References Cited

U.S. PATENT DOCUMENTS

| | | | | |
|---|---|---|---|---|
| 4,965,129 A | * | 10/1990 | Bair ........................ | C09K 3/32 210/502.1 |
| 7,137,477 B2 | * | 11/2006 | Keller ................... | G10K 11/162 181/286 |
| 8,182,652 B2 | * | 5/2012 | Englert ..................... | D21J 1/08 162/129 |

FOREIGN PATENT DOCUMENTS

| | | |
|---|---|---|
| CN | 1809871 A | 7/2006 |
| CN | 201989382 U | 9/2011 |

(Continued)

OTHER PUBLICATIONS

International Search Report for International Application No. PCT/EP2017/053617 dated May 29, 2017.

*Primary Examiner* — Andrew T Piziali
(74) *Attorney, Agent, or Firm* — Nexsen Pruet, PLLC; Seth L. Hudson

(57) ABSTRACT

The present invention includes a multi-layer acoustic and/or reinforcing non-woven fabric.

5 Claims, 1 Drawing Sheet

- Total composite (5)
- PP/PET non-woven fabric (1)
- Three-layer sheet (2)
- Ground material and dust scraps (3)
- PP/PET non-woven fabric (4)

(51) Int. Cl.
    *B32B 5/08*                 (2006.01)
    *B32B 27/12*            (2006.01)
    *B32B 3/26*              (2006.01)
    *B32B 27/34*            (2006.01)
    *B32B 27/32*            (2006.01)
    *G10K 11/168*         (2006.01)
    *B32B 5/26*              (2006.01)
    *B32B 27/08*            (2006.01)
    *B32B 27/14*            (2006.01)
    *B32B 27/36*            (2006.01)
    *B60R 13/08*            (2006.01)

(52) U.S. Cl.
    CPC ... *B32B 2250/20* (2013.01); *B32B 2262/0253* (2013.01); *B32B 2262/0284* (2013.01); *B32B 2264/0285* (2013.01); *B32B 2264/062* (2013.01); *B32B 2272/00* (2013.01); *B32B 2307/102* (2013.01); *B32B 2307/546* (2013.01); *B32B 2307/718* (2013.01); *B32B 2471/04* (2013.01); *B32B 2605/003* (2013.01); *B60R 13/08* (2013.01)

(56) References Cited

FOREIGN PATENT DOCUMENTS

| | | |
|---|---|---|
| CN | 102812185 A | 12/2012 |
| CN | 103556396 A | 2/2014 |
| CN | 203876334 U | 10/2014 |
| DE | 1 635 692 A1 | 7/1971 |
| DE | 9108065 U1 | 8/1991 |
| DE | 10147527 A1 | 4/2003 |
| DE | 103 24 257 B3 | 9/2004 |
| DE | 10 2006 005 369 B3 | 7/2007 |
| DE | 10 2007 033 635 A1 | 12/2008 |
| DE | 10 2007 036 952 A1 | 2/2009 |
| JP | 01-209131 H | 8/1989 |
| JP | 2005-087649 A | 4/2005 |
| JP | 2005-215117 A | 8/2005 |
| JP | 2005-246952 A | 9/2005 |
| JP | 2010-064361 A | 3/2010 |
| JP | 2011-084855 A | 4/2011 |
| JP | 2015-030218 A | 2/2015 |
| KR | 20030000746 A | 1/2003 |
| KR | 101565103 B1 | 11/2015 |
| TR | 200803410 A2 | 12/2008 |
| WO | 2007/090479 A1 | 8/2007 |
| WO | 2010-038491 A | 4/2010 |
| WO | 2012/025253 A1 | 3/2012 |
| WO | 2014/082869 A1 | 6/2014 |

* cited by examiner

MULTI-LAYER ACOUSTIC AND/OR REINFORCING NONWOVEN FABRIC

FIELD OF THE INVENTION

The invention relates to a multi-layer acoustic and/or reinforcing non-woven fabric.

BACKGROUND OF THE INVENTION

Certainly, DE 1062206 C can be considered as a starting point for the use of the term "non-woven fabric" as a synonym for an acoustic and/or reinforcing non-woven fabric. It can be seen therefrom that so-called non-woven fabrics are obtained as end products prepared by applying film-forming adhesive agents on the basis of aqueous dispersions to fibrous webs of synthetic and natural fibers, followed by drying at an elevated temperature. Before that, the fibrous webs bonded by binders were referred to as impregnated fibrous fabrics, artificial leather-like sheets, or gummed fiber-containing sheets and the like; the fibrous webs bonded by needling were referred to as needle felts. The products made from layers of non-wovens belong to non-woven fabrics rather than wadding if not only a superficial bonding is effected, but substantial bonding is effected also within, or if preferably only the layers close to the surface are bonded and smoothed, but completely and uniformly. For the distinction between felts and non-woven fabrics, reference is made to DIN 61 205 (withdrawn without replacement in 2006), in which the fact that the use of feltable fibers is necessary for a felt is mentioned as the distinction between a felt and a needle-punched felt (needled felt) or needled non-woven fabric (needle-punched non-woven fabric). A distinction between a needle-punched felt and a needle-punched non-woven fabric is made by means of the density. Accordingly, products having a density <0.15 g/cm$^3$ are included with non-woven fabrics, while all having the same or a higher density are included with needle-punched felts.

This distinction between a needle-punched felt and a needle-punched non-woven fabric was no longer made in the follow-up standard DIN EN 29 092:1992. Only felts prepared by wet milling were still excluded from non-woven fabrics. the most recent standard DIN EN ISO 9092, which is valid for the definition of non-woven fabrics, goes even further.

The methods of non-woven bonding, i.e., the conversion of a fibrous web to a non-woven fabric by producing a stronger bonding between the fibers than that found in a non-woven, are mostly classified into mechanical, chemical and thermal ones.

In mechanical bonding methods, the bonding between the fibers is created by a frictional connection or by a combination of frictional connection and positive form locking.

In frictional connection, the distance between neighboring fibers is reduced as compared to that found in a non-woven by non-woven compactification. Thus, the mutual adhesion of the fibers is increased, and higher forces can be transmitted. The resistance of the non-woven against deformation becomes higher; the non-woven becomes stronger. The compactification can be achieved by shrinking all fibers or a fraction thereof if the fibers are shrinkable upon exposure to heat and/or a swelling agent. Shrunk non-woven fabrics or swollen non-woven fabrics are formed. Also, the compactification can be effected by pressing (mostly calendaring) or milling, in which the fibers of the non-woven must be feltable and become felted with one another by simultaneous exposure to thermal, chemical and mechanical actions. The milling forms felts or milled non-woven fabrics.

In the non-woven fabrics produced by a combination of frictional connection and positive form locking, the fibers of the non-woven are mutually entangled by mechanical actions.

Such entangling of the fibers and thus compacting and reinforcing of the non-woven can be effected by needle-punching, in which a plurality of special needles arranged in a needle bed or needle beam (barbed needles, fork needles) are punched in and out. Needle-punched non-woven fabrics are formed thereby. This type of solidification can be effected with both non-wovens made of spun fibers and those made of continuous fibers.

When compound needles are used for punching the non-woven, fiber bundles may be "looped", i.e., they adopt loop-shaped arrangements ("loops"). Thus, transverse laid non-wovens made of spun fibers are used. The fiber non-woven knitting method forms fibrous non-wovens, such as Malivlies (Wikipedia, keyword Vliesstoff, Feb. 11, 2016).

According to DIN 61 210, non-woven fabrics are defined as "fabrics that wholly or essentially consist of fibers". The fibers that define the non-woven fabric character "are arranged randomly or oriented in certain directions". The bonding between the individual fibers is effected by positive form locking (entanglement) or by friction (adhesive bonding). (Burkhard Wulfhorst, Textile Fertigungsverfahren, Munich, Vienna: Hanser 1998, pp. 167 to 186).

In motor vehicles, thermoformable acoustic and/or reinforcing non-woven fabrics are employed, especially in the passenger compartment and in the luggage space. These are mostly loosely compressed textile fiber non-woven fabrics with thermoset or thermoplastic bonding, and combinations of foam and/or non-woven layers having the same or different flow resistances. In addition, so-called flow non-woven fabrics are also employed in order to tune the acoustic properties selectively. In floor coverings, porous layers open to air and thus sound are inserted between the actual top fabric and the process-related sealing and heavy layers or the insulation to influence the sound absorbing capacity in correlation with tread rigidity. Polyester and mixed fiber non-wovens are employed here as said porous layers open to air and thus sound. The tread resistance is influenced by the proportion of bicomponent (BiCo) fibers in the non-woven fabrics.

In bulkhead material structures, one-layer non-woven fabrics, multilayer non-woven fabrics and foam-backed non-woven fabrics are often employed.

Non-woven fabrics and/or combinations of non-woven fabrics are also employed in the trunk, predominantly in side trims, tailgate trims and spare wheel recesses.

DE 10 2007 033 635 A1 describes a non-woven fabric molded part for vehicles. The starting point for a non-woven fabric molded part is a non-woven fabric semifinished product consisting of several non-woven layers stacked on one another, which have different mutual designs. Each non-woven layer is constituted by a mixture of structure-forming fibers on the one hand and matrix-forming fibers on the other. When subjected to a heat treatment at a defined temperature, only the matrix-forming fibers will melt, while the structure-forming fibers will not. In order to improve the mechanical and acoustic properties of the molded part, it is proposed to provide the matrix-forming fibers at least in every non-woven layer that produces the hidden side of the finished molded part in a later case of use with a lower melt viscosity and/or a higher melt index as compared to the other non-woven layers.

WO 2007/090479 A1 relates to a process for preparing sound-absorbing molded parts, especially for use as motor vehicle bulkhead trims or as a backing fabric for motor vehicle carpets. The process essentially encompasses the following steps: pneumatic application of different materials at least comprising virgin and/or recycled thermoplastic fusible fibers, recycled foam particles and recycled heavy-layer particles to a belt conveyor or an area in such a way as to produce, from the materials, a mat-like two-dimensional structure, heating and pressing of the heated two-dimensional structure, in the course of which defined regions of the two-dimensional structure are densified to differing degrees.

TR 200803410 relates to a process for the reuse of relatively coarse waste materials, for example, textile scraps from the production process of automobile parts, and to products prepared therefrom. The process is characterized in that the waste materials are broken into relatively small pieces. This ground material is then applied to a substrate. Subsequently, an upper layer of another raw material is applied to the surface of the waste material, and the layers are bonded to one another. TR 200906997 describes an analogous process in which a further hard layer is additionally incorporated.

BRIEF SUMMARY OF THE INVENTION

In contrast, the object of the present invention is to provide a multi-layer acoustic and/or reinforcing non-woven fabric, especially for the field of motor vehicles, having excellent acoustic properties using a per se known ground material from the production of objects containing fibers in the motor vehicle sector together with corresponding thermoplastic dust scraps that have not been put to use to date.

BRIEF DESCRIPTION OF THE DRAWINGS

The present invention is illustrated and described herein with reference to the drawing, in which like reference numbers denote like method steps and/or system components, respectively, and in which.

BRIEF DESCRIPTION OF THE INVENTION

Figure 1:
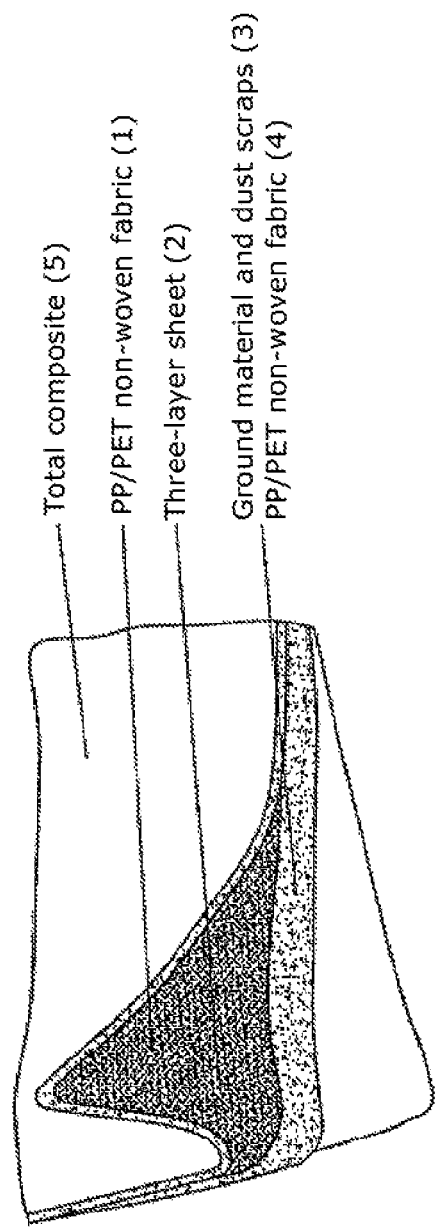
FIG. 1 is a perspective view of the non-woven fabric of the present invention.

In a first embodiment, the above object is achieved by a multi-layer needle-punched acoustic and/or reinforcing non-woven fabric comprising two outer cover non-woven fabrics, namely:

a) a first cover non-woven fabric consisting of a PE adhesive non-woven fabric with a basis weight of 30 g/m² to 200 g/m², preferably from 50 g/m² to 150 g/m², and a second cover non-woven fabric consisting of a PP/PET non-woven fabric with a basis weight of 50 g/m² to 250 g/m², preferably from 80 g/m² to 200 g/m², or b) both cover non-woven fabrics are a PP/PET cover non-woven fabric with a basis weight of 100 g/m² to 800 g/m², preferably from 300 g/m² to 600 g/m²;

each containing a layer sandwiched between the outer cover non-woven fabrics and consisting of a ground material with a basis weight of 250 g/m² to 700 g/m² of PE, PET, PP, multicomponent (BiCo) fibrous material;

characterized in that said ground material contains from 5% by weight to 50% by weight, preferably from 10% by weight to 40% by weight, based on the ground material, of dust scraps of reclaimed cotton, PET and multicomponent (BiCo) fibers.

PE represents a polyethylene homopolymer, or may also represent a polyethylene copolymer with a predominant fraction of polyethylene. PP represents a polypropylene homopolymer, or may also represent a polypropylene copolymer with a predominant fraction of polypropylene. PET represents a polyester, especially a polyethylene terephthalate. BiCo represents bicomponent or multicomponent fibers.

Thus, an essential feature of the present invention is the use of dust or dust scraps from the production of textile and non-textile parts, especially motor vehicle parts, which have previously been supplied, not to reuse, but to disposal (for example, combustion).

Another preferred alternative embodiment of the present invention consists in a multi-layer needle-punched acoustic and/or reinforcing non-woven fabric, characterized in that a PE/PA/PE sheet with a total thickness of 40 µm to 150 µm, especially from 60 µm to 100 µm, is provided between the top, in the direction of needle punching, cover non-woven fabric and the layer of ground material/dust.

Another preferred embodiment of the present invention also consists in a multi-layer needle-punched acoustic and/or reinforcing non-woven fabric, characterized in that a PE/PA/PE sheet with a total thickness of 40 µm to 150 µm, especially from 60 µm to 100 µm, is provided between the top, in the direction of needle punching, cover non-woven fabric plus the layer of ground material/dust, and the bottom cover non-woven fabric.

Particularly preferred within the meaning of the present invention is a multi-layer acoustic and/or reinforcing non-woven fabric, characterized in that one of the cover non-woven fabrics comprises a sheet non-woven fabric of PET-PE/PA/PE whose PE side faces towards the ground material.

Further preferred within the meaning of the present invention is a multi-layer acoustic and/or reinforcing non-woven fabric, characterized in that both cover non-woven fabrics comprise a sheet non-woven fabric of PET-PE/PA/PE whose PE sides respectively face towards the ground material.

In addition, within the meaning of the present invention, a multi-layer acoustic and/or reinforcing non-woven fabric is preferred that is characterized in that said PE/PA/PE sheet or said sheet non-woven fabric of PET-PE/PA/PE is microperforated when the total composite is being needle-punched (in line).

Further, the present invention relates to a corresponding process for producing a multi-layer acoustic and/or reinforcing non-woven fabric as defined above, characterized in that the above defined ground material having a grain size within a range of from 1 mm to 8 mm, especially from 2 mm to 3 mm, and containing the dust scraps having a grain size of from 1 µm to 1 mm is scattered onto the first cover non-woven fabric, and subsequently the second cover non-woven fabric is applied, especially fed on top, and the total composite is compacted and needle-punched.

A particularly preferred process within the meaning of the present invention is characterized in that a PE/PA/PE sheet is additionally fed below the top cover non-woven fabric or above the bottom cover non-woven fabric, and said PE/PA/PE sheet is microperforated in line by the needle-punching of the total composite.

Examples

In a first application, 500 g/m² of ground material containing PET, PP and/or PET/coPET bicomponent fibers was ground to a particle size of 2 mm, and 20% by weight, based on the ground material, of dust scraps were scattered between a PP/PET non-woven fabric of 150 g/m² on the one hand and a PE adhesive non-woven fabric of 70 g/m² on the other, and the composite obtained was needle-punched.

In a thermoforming plant comprising a delivery table, a contact heating panel 1, a contact heating panel 2 and a deforming tool, the above non-woven fabric was backed with a commercially available dilour carpet (560 g/m² PET, 80 g/m² latex, 80 g/m² PE coating) and shaped into a floor covering.

The PE adhesive non-woven fabric faced towards the PE carpet coating.

In the subsequent testing of the floor covering in accordance with the specification, the total composite showed improved properties, especially with respect to flexural rigidity, as compared to a (virgin) PET non-woven fabric.

In a second application, the setting of the flow resistance was taken into account, in particular.

On the one hand, the following material structure (FIG. 1) was prepared: 200 g/m² PP/PET cover non-woven fabric 1, three-layer sheet (PE/PA/PE) 2, ground material of PET, PP, PET/coPET bicomponent fibers 3, ground to a particle size of 2 mm, and 30% by weight, based on the ground material, dust scraps 3, 100 g/m² PP/PET non-woven fabric 4. This total composite 5 was needle-punched, the three-layer sheet 2 being microperforated by this process step.

In a thermoforming plant comprising a delivery table, a contact heating panel 1, a contact heating panel 2 and a deforming tool, the above non-woven fabric 5 was also backed with a dilour carpet (560 g/m² PET, 80 g/m² latex, 80 g/m² PE coating) and shaped into a floor covering.

The flow resistance of the total composite consisting of the dilour carpet plus non-woven fabric 5 was 1004514 Ns/m⁻⁴.

Figure 2:
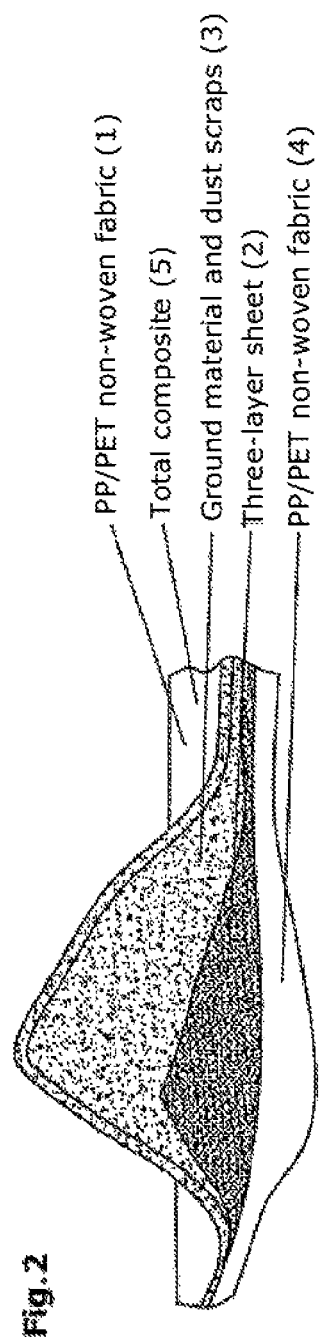
FIG. 2 is a perspective view of another embodiment of the non-woven fabric of the present invention.

On the other hand, the following material structure (FIG. 2) was prepared: 200 g/m² PP/PET cover non-woven fabric 1, ground material of PET, PP, PET/coPET bicomponent fibers 3, ground to a particle size of 2 mm, and 30% by weight, based on the ground material, dust scraps 3, three-layer sheet (PE/PA/PE) 2, and 100 g/m² PP/PET non-woven fabric 4. This total composite 5 was needle-punched, the three-layer sheet 2 being microperforated by this process step.

In a thermoforming plant comprising a delivery table, a contact heating panel 1, a contact heating panel 2 and a deforming tool, the above non-woven fabric 5 was also backed with a dilour carpet (560 g/m² PET, 80 g/m² latex, 80 g/m² PE coating) and shaped into a floor covering.

The flow resistance of the dilour carpet plus non-woven fabric 5 was 526222 Ns/m⁻⁴.

The flow resistance can be influenced by the different arrangement of the three-layer sheet 2, its microperforation (in line) in the process of needle-punching the total composite 5, and thus the correlation of perforation (proportion of open holes) and ground material 3.

The invention claimed is:

1. A multi-layer needle-punched acoustic and/or reinforcing non-woven fabric comprising two outer cover non-woven fabrics, comprising:
   a) a first cover non-woven fabric consisting of a PE adhesive non-woven fabric with a basis weight of 30 g/m² to 200 g/m², and a second cover non-woven fabric consisting of a PP/PET non-woven fabric with a basis weight of 50 g/m² to 250 g/m², or
   b) said first cover non-woven fabric and said second cover non-woven fabric are a PP/PET cover non-woven fabric with a basis weight of 100 g/m² to 800 g/m²;
   each containing a layer sandwiched between the outer cover non-woven fabrics and consisting of a ground material with a basis weight of 250 g/m² to 700 g/m² of PE, PET, PP and/or multicomponent (BiCo) fibrous material;
   characterized in that
   said ground material contains from 5% by weight to 50% by weight, based on the ground material, of dust scraps of PET and multicomponent (BiCo) fibers, wherein the ground material having a grain size from 1 mm to 8 mm and containing the dust scraps having a grain size from 1 μm to 1 mm.

2. The multi-layer needle-punched acoustic and/or reinforcing non-woven fabric according to claim 1, characterized in that a PE/PA/PE three-layer sheet with a total thickness of 40 μm to 150 μm is provided between the top, in the direction of needle punching, cover non-woven fabric and said ground material.

3. The multi-layer needle-punched acoustic/reinforcing non-woven fabric according to claim 1, characterized in that a PE/PA/PE three-layer sheet with a total thickness of 40 μm to 150 μm is provided between the top, in the direction of needle punching, cover non-woven fabric plus the layer of ground material/dust, and the bottom cover non-woven fabric.

4. A process for producing a multi-layer acoustic and/or reinforcing non-woven fabric comprising
   providing a) a first cover non-woven fabric consisting of a PE adhesive non-woven fabric with a basis weight of 30 g/m² to 200 g/m², and a second cover non-woven fabric consisting of a PP/PET non-woven fabric with a basis weight of 50 g/m² to 250 g/m², or
   b) said first cover non-woven fabric and said second cover non-woven fabric are a PP and PET cover non-woven fabric with a basis weight of 100 g/m² to 800 g/m²;
   each containing a layer sandwiched between the outer cover non-woven fabrics and consisting of a ground material with a basis weight of 250 g/m² to 700 g/m² of PE, PET, PP, and/or multicomponent (BiCo) fibers material;
   characterized in that
   said ground material contains from 5% by weight to 50% by weight based on the ground material, of dust scraps of PET and multicomponent (BiCo) fibers; wherein
   the ground material has a grain size within a range of from 1 mm to 8 mm and containing the dust scraps having a grain size of from 1 μm to 1 mm, and the ground material are scattered onto the first cover non-woven fabric, and subsequently the second cover non-woven fabric is fed on top, the total composite is compacted, and needle-punched.

5. The process according to claim 4, characterized in that at least one PE/PA/PE three-layer sheet is additionally fed below the top cover non-woven fabric or above the bottom cover non-woven fabric, and said PE/PA/PE three-layer sheet is microperforated by the needle-punching of the total composite.

\* \* \* \* \*